United States Patent [19]

Frater et al.

[11] Patent Number: 5,680,275

[45] Date of Patent: Oct. 21, 1997

[54] ADJUSTABLE SOLDER BUMP SPACER FOR SLIDER-SUSPENSION ATTACHMENT

[75] Inventors: Norman Kermit Frater; Surya Pattanaik; Oscar Jaime Ruiz; Wing C. Shum, all of San Jose, Calif.

[73] Assignee: International Business Machines Corporation, Armonk, N.Y.

[21] Appl. No.: 618,672

[22] Filed: Mar. 19, 1996

[51] Int. Cl.⁶ .................................................. G11B 5/48
[52] U.S. Cl. .................................................. 360/104
[58] Field of Search .................................... 360/104

[56] References Cited

U.S. PATENT DOCUMENTS

| | | | |
|---|---|---|---|
| 4,761,699 | 8/1988 | Ainslie | 360/104 |
| 4,789,914 | 12/1988 | Ainsile et al. | |
| 4,878,611 | 11/1989 | LoVasco et al. | |
| 4,997,122 | 3/1991 | Zimmer | |
| 5,307,983 | 5/1994 | Dudderar et al. | |
| 5,530,604 | 6/1996 | Pattanaik | 360/104 |

FOREIGN PATENT DOCUMENTS

| | | |
|---|---|---|
| A 0 265 720 | 4/1988 | European Pat. Off. |
| A 0 412 739 | 2/1991 | European Pat. Off. |
| A 0 683 491 | 11/1995 | European Pat. Off. |

*Primary Examiner*—A. J. Heinz
*Attorney, Agent, or Firm*—Michael N. Meller

[57] ABSTRACT

A slider-suspension assembly for a data-recording disk file is provided having a spacer device separating the slider from the suspension. The spacer device includes one or more solder bumps having a height that is precisely controlled to provide the desired spacing. The spacing device prevents contact between the slider and the suspension.

20 Claims, 5 Drawing Sheets

ADJUSTABLE SOLDER BUMP SPACER FOR SLIDER-SUSPENSION ATTACHMENT

TECHNICAL FIELD

This invention relates to a new and improved slider-suspension assembly for data recording disk files and to a method for making such an assembly. In particular, the invention relates to an adjustable solder bump spacer for spacing the slider from the suspension at a desired distance, and to a method for providing such spacing.

BACKGROUND OF THE INVENTION

Disk files are information storage devices which utilize at least one rotatable disk having concentric data tracks containing such information. A slider-suspension assembly is provided for bringing a slider containing a read/write device close to the data surface of the rotatable disk utilized for storing the data on various tracks concentrically arranged thereon.

A head-positioning actuator is connected to the read/write head for moving the head radially across the various tracks of the disk to reach the appropriate position for writing or reading data to or from a specific track. The head contains a slider on which, as noted above, is contained the read/write device.

The suspension supporting the slider may be flexed through different angles so that the slider can be properly positioned at the appropriate track on the disk when desired. Thus, the suspension contains a flexure element known as the flexure. The suspension provides the dimensional stability needed for the slider and the actuator arm. It controls the flexibility and pitch-and-roll motion of the slider relative to its direction of motion on the rotating disk and resistance to yaw motion.

The slider generally has an air-bearing surface which is supported adjacent to the data surface of the disk by a cushion of air generated by the rotating disk. The slider is attached to the suspension on the side of the slider opposite the air-bearing surface.

Typically the suspension will provide a lower force against the slider which is compensated for by the force of the air bearing between the slider's air-bearing surface and the disk surface. Accordingly, the slider is maintained in extremely close proximity to—but out of contact with—the data surface of the disk.

The suspension can comprise a load beam, which is mounted on one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air-bearing surface and the rotating disk. Such a suspension is described in U.S. Pat. No. 4,167,765, which is assigned to the same assignee as the present application. An example of a conventional slider is described in U.S. Pat. No. 3,823,416, which is assigned to the same assignee as the present application.

The suspension generally contains electrically conductive members so as to conduct signals picked up by the reading head on the slider and to conduct signals to be written on the disc by the writing head. It is very important to prevent the back surface of the slider from coming into contact with the conductive surface of the suspension. Such contact can cause short circuits which will obscure the reading and writing of the data. Since the slider is flexed by the flexure element of the suspension, there is always a possibility that such flexure will cause undesired contact.

It is clearly recognized that the requirement for more and more information storage capacity requires the slider and the suspension assembly to be made still smaller so that the information may be written to and read from the data surface of the rotating disk.

It has been known to make mechanical bond between the back surface of the slider and the suspension by utilizing a plurality of solder balls arranged on solder contact pads on the back surface of the slider. These solder balls make contact with the electrically isolated, solder wettable pads on the surface of the suspension. Electrical connection between the transducer and the lead lines on the suspension are made by another set of solder connections to provide a good signal transmission path in both directions. Such an arrangement is shown in U.S. Pat. No. 4,761,699, assigned to the same assignee as the present invention.

In more conventional arrangements of the slider-suspension assembly, the electrical connections made to the slider include electrical lead lines which pass over the top of the slider. As noted above, in flexing the slider to pitch and roll with respect to the suspension, the electrical lead lines can be electrically shorted if the suspension allows the slider to deflect too much.

If the electrical lead lines do not pass over the top of the slider, but pass adjacent the surface, this will take up a good deal of disk space and prevent the miniaturization of the apparatus which is being required more and more as greater capacities of storage information are utilized.

SUMMARY OF THE INVENTION

A spacing device is provided between the suspension and the back side of the slider to space the suspension at a preselected distance from the slider. The spacing device may be in the form of one or more solder bumps. This spacing is needed to prevent contact between the electrical traces running on the suspension, and the slider itself. It is also needed to provide a space for the deflection of the flexure. The solder bumps are arranged to have a preselected height at assembly so that the spacing between the slider and the suspension can be carefully controlled.

A feature of the present invention is that the solder bump spacers may be formed at the same time and using the same process as used for the other set of solder bumps intended for electrical connections to the slider. Thus, additional processing steps are avoided.

In the method incorporating the principles of the present invention, solder bumps are formed on the flexure area of the suspension to which the slider will later be attached. The volume of the solder and the size of the solder pad to which the solder bumps are attached can be controlled, so that the ultimate height of the solder bumps at the end of the manufacturing process can be precisely controlled. Therefore, the spacing between the slider and the suspension can be precisely controlled.

During the process, the solder bumps can be heated to form hemispherical shapes. Adhesive material is then placed in between the solder bumps so that the slider can then be attached to the suspension via the adhesive and the solder bumps will provide a point contact with the slider to precisely position the slider a desired distance away from the suspension. This results in a slider-suspension arrangement wherein the slider is correctly spaced from the suspension to avoid any electrical shorting problems. As noted above, the spacing can be achieved without the need for additional parts and welding in the manufacturing process.

For a fuller understanding of the nature and advantages of the present invention, reference should be made to the following detailed description taken in conjunction with the accompanying drawings.

DETAILED DESCRIPTION OF THE INVENTION

Figure 1:
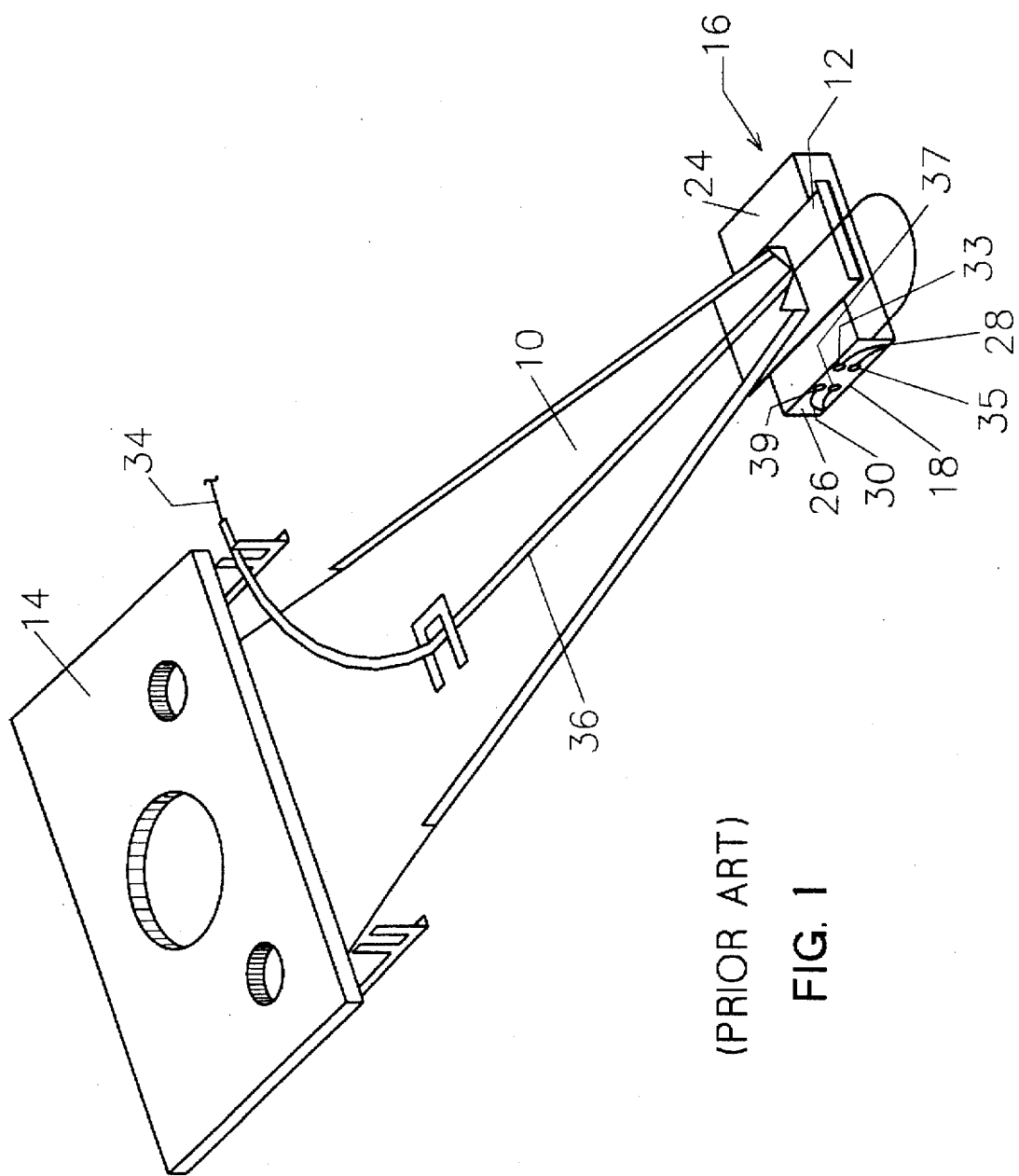
FIG. 1 is a perspective view of a conventional slider-suspension assembly illustrating the mechanical attachment of the slider to the flexure of the suspension.

Referring to the drawings, and more particularly to FIG. 1, a prior art arrangement of a conventional slider-suspension assembly is illustrated. The suspension assembly includes a load-beam 10 and a flexure element or flexure 12 located at the end of the load-beam 10. The suspension is attached to disk-file actuator arm (not illustrated) by means of a mount plate 14. The slider 16 is a conventional slider formed of a ceramic material, such as a mixture of aluminum ($Al_2O_3$) and titanium carbide (TiC). The slider 16 has an air-bearing surface 18 and a back side 24. The back side 24 is opposite and generally parallel to the air-bearing surface 18. The slider 16 is secured to the flexure 12 by an epoxy bond between the back side 24 and the flexure 12.

The slider 16 has a trailing edge 26 on which are located transducers 28 and 30. Typically, multiple thin-film transducers for reading and writing information are formed on a single slider, even though only one of the transducers is active as a read/write element. This improves the yield of the slider during the thin-film application process. The transducers 28, 30 have bonding pads 33, 35 and 37, 39 respectively for connection to the read/write electronics of the disk file.

In this prior art embodiment, shown in FIG. 1, the electrical attachment to the read/write electronics is made by twisted wires 34 which extend from the read/write electronics through a tube 36 on load-beam 10 and out the end of tube 36. The ends of wires 34 are ultrasonically bonded to the pads 33, 35 of the transducer 28.

It is clear that with the conventional arrangement shown in FIG. 1, the slider 16 is urged toward the dam surface of the rotating disk (not shown). The air-bearing surface 18 of the slider 16 is supported adjacent the data surface of the disk by a cushion of air which is generated by the rotating disk. The suspension provides the dimensional stability between the slider and the actuator arm, and the controlled flexibility in the pitch-and-roll motion of the slider relative to its direction of motion on the rotating disk and resistance to yaw. Thus, the suspension provides a lower force against the slider, which is compensated by the force of the air bearing between the slider's air-bearing surface and the disk surface.

The slider 16 is moved radially along the rotating disk to a location opposite the desired track of the data-bearing surface of the disk into which information is to be written or from which information is to be read. It is clear that as the slider is moved in such radial direction and is flexed by the flexure 12 during such movement, that the slider 16 may be moved into electrical contact with the flexure 12. With more recent developments in flexure and slider construction, due to the required miniaturization, these problems become more critical.

Figure 2:
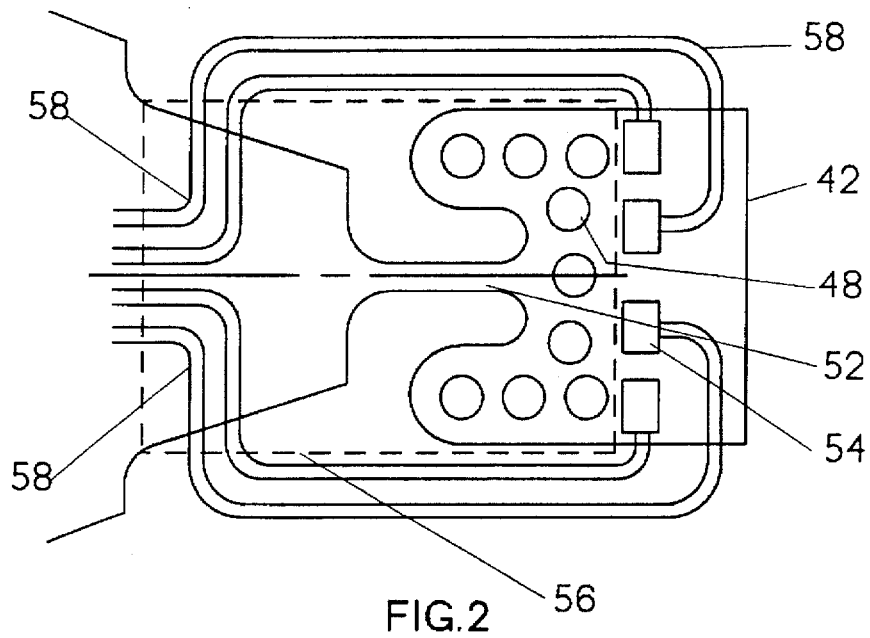
FIG. 2 is a plan view constructed in accordance with a preferred embodiment of the present invention of the bottom surface of the suspension showing the slider in dotted outline.
Figure 3:
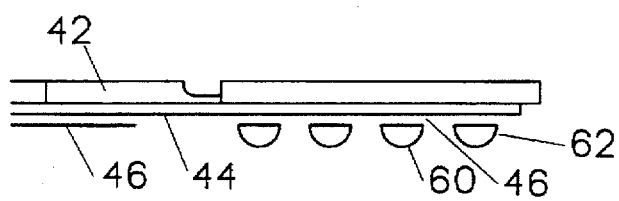
FIG. 3 is a side view of the embodiment of FIG. 2 prior to the attachment of the slider to the suspension showing the arrangement of the electrical and the spacing solder bumps.

Referring now to FIGS. 2 and 3, a slider-suspension assembly incorporating the principles of the present invention is illustrated. FIG. 2 is a plan view of the bottom of the assembly, while FIG. 3 is a side view thereof. The suspension is a laminated structure made up of three layers, best seen in FIG. 3. The upper layer 42 may be made of stainless steel, the middle layer 44 may be made of an insulating material like polyimide, while the bottom layer 46 may be made of a good electrical conductor such as copper.

As shown in FIG. 2, the copper layer 46 is provided with solder contact pads 48, adapted to have the solder spacers mounted thereon. In FIG. 2, the steel layer 42 has been etched to form a flexure element 52, which is thinner than the overall dimensional of the steel element 42, and serves as a mechanical communication between the end of the suspension assembly and the load-beam to which the flexure member is ultimately connected. In this arrangement, it is clear that the slider which is attached to the suspension can be moved through several angles with respect to the rotating disk for reading and writing purposes.

Also shown in FIG. 2 are electrical termination pads 54 which are used for making electrical connections to the slider. The slider 56 is shown in dotted outline in FIG. 2 so that its "footprint" with respect to the suspension arranged thereabove is clear. It can be seen that the electrical connections to the slider 56 are made via the copper connectors 58 ending at electrical pads 54. The path of the copper connectors, shown in FIG. 2, passes over the slider footprint in their path to the read/write electronics.

In such an arrangement, it can be seen that as the slider 56 is moved through various motions by the thin flexure element 52, there is a possibility that the copper connectors 58 may, in fact, contact the upper surface of the slider. If the slider body is made from an electrically conducting material, the copper connector lines will be electrically shorted. As noted in FIG. 2, the flexure portion 52 of the suspension is almost wholly within the footprint of the slider 56. It is therefore essential to separate the flexure from the slider to prevent contact between them when the flexure deflects due to the preload of the slider.

If the flexure s flexible members are located outside the slider footprint, the deflection does not present a serious problem. However, it is clear that placing such flexure portion outside of the slider footprint will utilize additional disk real estate. This is not desirable in arrangements in which space is extremely important.

In conventional suspensions using a dimple, the flexure is an additional piece and is formed in the area (footprint) to provide desired spacing between the flexure legs and the slider. With conventional suspensions having no dimple and with integral flexures, spacing is normally provided by forming and by partially etching the flexure from the slider side. Forming is restricted to 50 percent of the slider's size and to 3 mil (0.0762 mm) thick load-beams. This results in high stiffness.

In laminated suspensions, the steel layer is 2 mil (0.0508 mm) thick and there is a copper layer on the slider side. Thus, partial etching of the steel layer can be done from the arm side only. If a dimple is used with planar designs, a separation is required between the slider and the copper conductors in order to avoid shorts when the conductors run over the top of the slider. Because of the presence of the copper conductors in the slider area, forming is severely constrained by the lack of in plane space. Normally, the addition of a separate component as a spacer is difficult because of the lack of available free space for welding, and because welding produces unacceptable distortions. This is particularly true in the case of Pico sliders which are extremely small in size. The addition of separate spurs by using other methods, such as adhesives, is complicated due to the difficulty in handling and positioning such a small component.

The present invention overcomes these difficulties by providing one or more solder bumps on the copper layer 46 for providing precise spacing between the flexure element and the slider. The solder bumps are deposited on the solder-wettable copper pads arranged in positions 48 shown in FIG. 2. The solder bump may be formed by either evaporating solder onto the solder-wettable pad 48 through the mask openings or by spreading solder paste onto the solder-wettable pad 48 through the mask openings or by any other suitable means. The mask is then removed and thereafter the solder is heated so as to form the solder bump adhered to the solder contact pad. Such solder bumps 60 are best seen in FIG. 3. It can be seen that they are generally hemispherical in shape.

Also shown in FIG. 3 are solder bumps 62 which are not used for spacing but which make electrical connection to the slider. One advantage of using the method incorporating the principles of the present invention is that the solder bumps 60 used for spacing may be formed at the same time as the solder bumps 62 used for making electrical connections. Thus, a single process may be used for providing both the spacing and the electrical connections.

Such an arrangement and process is clearly advantageous and highly efficient. As noted above, it is very difficult otherwise to work in these small spaces without adversely effecting the areas between the slider and the suspension.

Figure 4B:
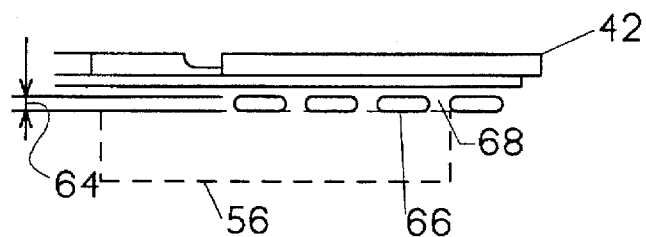
FIG. 4 made of FIGS. 4(a) and 4(b) are side views of the arrangement of FIGS. 2 and 3 after the slider has been attached to the suspension showing the spacing between the slider and the suspension.
Figure 4A:
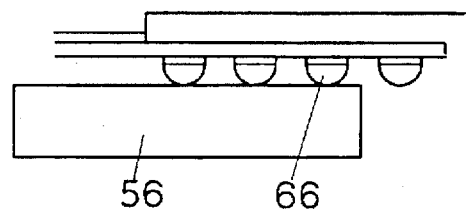

The spacing can now be controlled in two different ways. The height of the hemispherical bumps 60, can be tightly controlled by the size of the solder contact pad and the amount of solder used. Such an arrangement is shown in FIG. 4(a).

In another method, the solder bumps 60 and 62 may be flattened by means of a pressure plate. The pressure plate advance during flattening is limited by hard stops between the steel layer of the suspension and the plate to provide the desired height to a precise degree. The result is shown in FIG. 4(b).

In this embodiment, the gap 64 between the slider 56 and the suspension 42 is 0.5 mm. This gap is precisely controlled by the height of the flattened solder bumps 66. The height may also be controlled by the amount of paste used for forming the solder bumps, the size of the solder contact pad and the size of the openings of the mask utilized for forming the pads and the solder bumps. It can be seen that the solder bumps 62 used for making electrical connection to the slider transducers are outside of the edge of the slider and form no part in the spacing arrangement. The upper surfaces of the solder bumps 62 are electrically connected to the electrical conductors in the laminated load arm. The upper surface of the solder bumps 66 on the other hand contact only the insulating layer of the load arm while their lower surfaces contact the back side of the slider.

It should be noted that the size and spacing of the copper pads can be adjusted to provide a skewed angle between the suspension and the slider 56.

In order to connect the slider to the suspension, adhesive material 68 is applied at the right end of the suspension, as shown in FIG. 4, in the vicinity of the spacer bumps. This adhesive wets the solder bumps as well as some of the copper and steel surfaces in the neighboring area. The slider 56 is then placed in the appropriate position in contact with the solder bumps and maintained in such position by the adhesive material 68. An epoxy Blackmax manufactured by the Loctite Corporation may be used for this purpose.

With the above arrangement, the metallurgy of the solder bumps provides a material that has little elasticity left, and thus when plastic deformation takes place at yield, there is little springback.

It should be noted that the copper contact pads need not be circular, but can be provided in any shape desired to bring about the best spacing for the particular size of the slider and suspension.

Figure 5A:
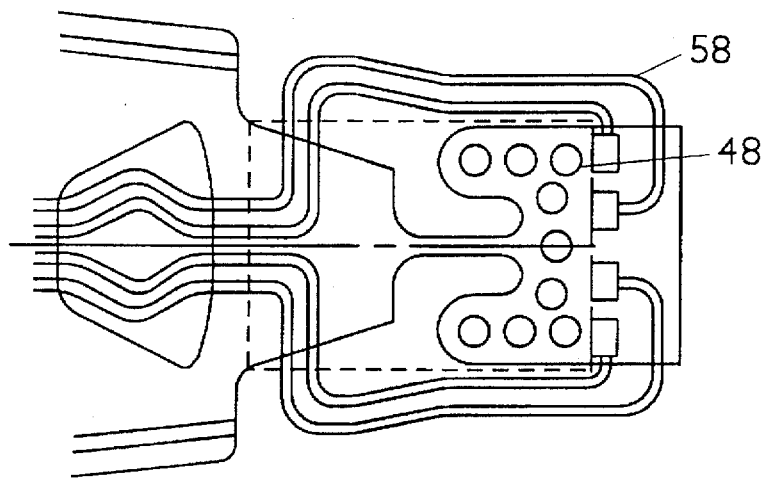
FIGS. 5(a) and 5(b); 6(a) and 6(b); and 7(a) and 7(b) illustrate different types of flexures and slider-suspension assemblies utilizing the principles of the present invention.
Figure 5B:
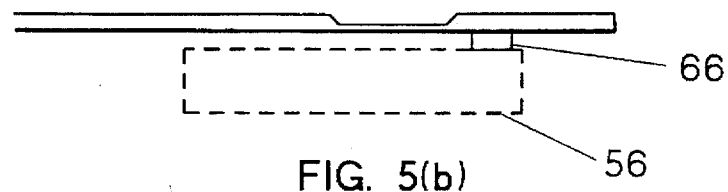

The location pattern for the spacer bumps depends on the particular type of flexure that is used. Suspensions with or without a dimple can be used. In FIGS. 5–7, different types of flexures and slider-suspensions that utilize the principles of the present invention are illustrated. In FIG. 5, the conductors 58 run over the slider footprint and therefore must be separated from the flexure.

Figure 6A:
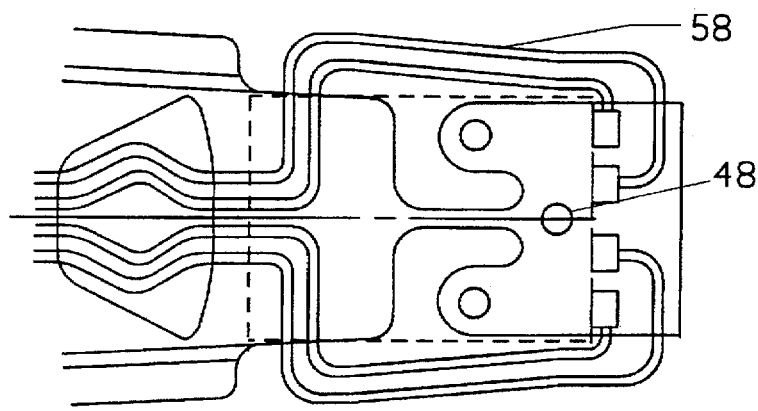
Figure 6B:
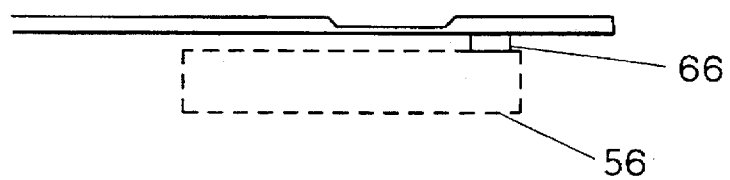

In FIG. 6A, the conductors 28 run outside the footprint or the border of the slider, but the flexure deflection requires a gap. This is best shown in FIG. 6B.

Figure 7A:
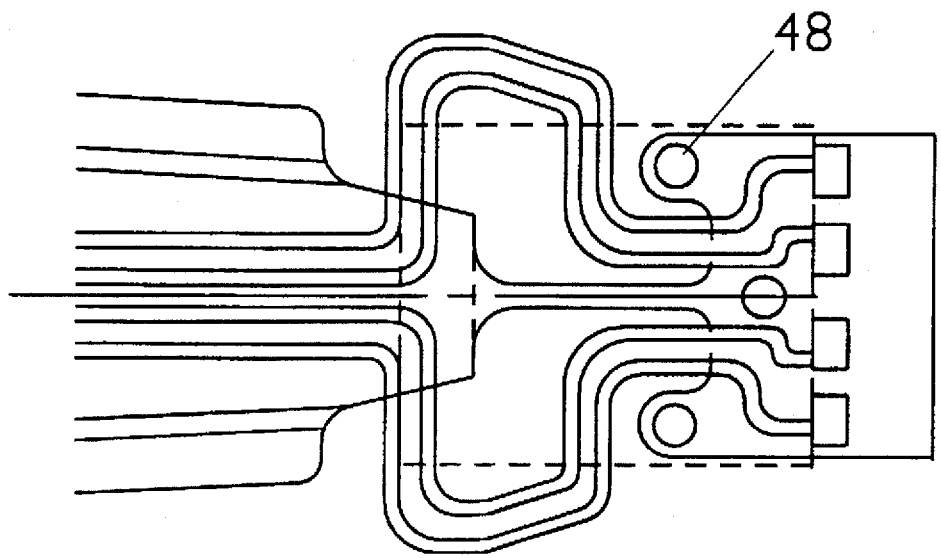
Figure 7B:
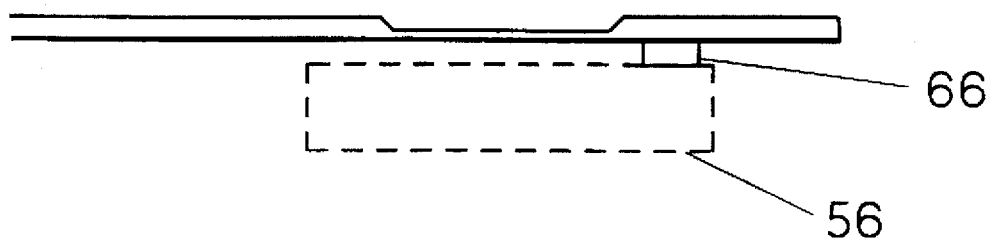

FIG. 7A shown another arrangement in which a spacer is required between the slider and the flexure.

As noted above, the adhesive is applied at the right end of the suspension in the spacer bump area for properly adhering the spacer to the suspension.

It is clear from the above that the method and apparatus utilizing the principles of the present invention will provide a simple way to manufacture a spacer device between the slider and the suspension. When the electrical connections are also made by solder bumps, as is illustrated in the aforementioned U.S. Pat. No. 4,761,699, it is possible to form the solder bump spacers for providing the point contact between the slider and the suspension during the same process that forms the solder bumps for the electrical connections. This is very economical since it saves times and additional manufacturing processing steps.

The height of the solder bumps can be precisely controlled by controlling the volume of the solder and the size of the solder pads to which the solder bumps are attached. This provides great flexibility for providing a spacer device, as can be seen with the various embodiments shown in FIGS. 2–7.

Figure 8:
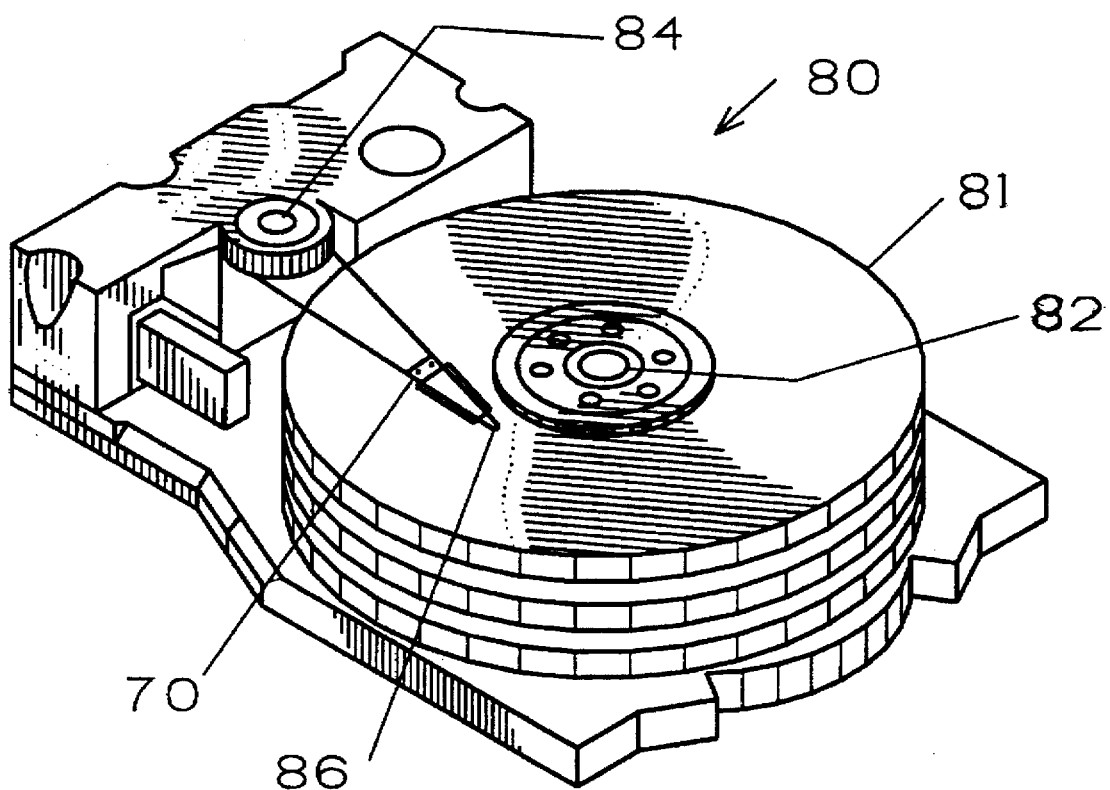
FIG. 8 is a perspective view of a magnetic disk device using a slider-suspension assembly of the type shown in FIG. 1.

Referring now to FIG. 8, a slider-suspenion assembly 70 such as that shown in FIG. 1 is shown mounted in operative relationship with a magnetic disk data storage system 80 having a plurality of disks 81. While the assembly 70 is shown facing the upper surface of the top disk 81 it can be appreciated that each of the disks 81 has a separate assembly. Of course, only a single magnetic disk may be used with a single slider-suspension assembly depending on the storage and space requirements.

As is well known, each of the disks 81 has a plurality of concentric data tracks. The disks are mounted on a spindle shaft 82 which is connected to a spindle motor (not shown). The assembly 70 is mounted on an actuator arm 83 in turn coupled to an actuator 84. The actuator 83 moves the arm or arms 83 in a radial direction across the respective disk when data is to be read from or written on to the disk.

A load/unload tab 86 may be utilized when it is desired to move the slider away from the rotating disk 81, when the apparatus is not being used, or when the apparatus is being shipped or otherwise mechanically handled. This avoids any mechanical damage to the sensitive slider 56 and flexure element 52.

While the preferred embodiments of the present invention have been illustrated in detail, it should be apparent that modifications and adaptations to those embodiments may occur to those skilled in the art without departing from the scope of the present invention as set forth in the following claims.

We claim:

1. A slider-suspension assembly for a data-recording disk file having a data surface comprising:

a slider having an air-bearing surface adapted to face said data surface of said disk and a back side opposite said air bearing surface;

a suspension adapted to be attached to said back side of said slider to bias said slider in close proximity to, but out of contact with, said data surface of said disk so that data can be read from or written into said data surface;

means for attaching said suspension to said back side of said slider; and a spacing device including at least one solder bump for spacing said suspension a preselected distance from said slider wherein said attaching means include an adhesive medium surrounding said at least one solder bump.

2. The slider-suspension assembly, according to claim 1, wherein said spacing device includes a plurality of solder bumps of predetermined heights, each making point contact with said slider.

3. The slider-suspension assembly, according to claim 2, wherein said attaching means include an adhesive medium surrounding said solder bumps.

4. The slider-suspension assembly, according to claim 1, wherein said suspension is a laminated planar suspension.

5. The slider-suspension assembly, according to claim 4, wherein said suspension includes steel, insulating polyimide, and copper layers.

6. The slider-suspension assembly, according to claim 5, wherein said suspension has a plurality of copper pads on which a plurality of solder bumps are located for forming said spacing device between said slider and said suspension.

7. A method for controlling the spacing between a slider and a suspension wherein said suspension has a generally planar surface facing the back side of the slider comprising the steps of:

forming at least one solder contact pad on said generally planar surface of said suspension;

depositing a solder bump having a substantially hemispherical shape on said solder contact pad;

placing adhesive material around said solder bump; and attaching said backside of said slider to said generally planar surface of said suspension by means of said adhesive material whereby said slider is spaced from said suspension by a distance determined by said solder bump.

8. The method, according to claim 7, wherein said solder bump is flattened before said adhesive material is added for attaching said suspension to said slider.

9. The method, according to claim 7, wherein said suspension is formed of a three-layer material of steel, insulating polyimide, and copper, and the step of forming said solder contact pad comprises the steps of locating a mask having at least one opening over said suspension, evaporating a first adhesion film onto said suspension through said mask opening, and evaporating a solder-wettable film onto said first adhesion film through said mask opening.

10. The method, according to claim 9, wherein the steps of forming the solder bump comprises the steps of either evaporating a solder film onto the solder-wettable film through said mask opening or spreading solder paste onto the solder-wettable film through said mask opening, removing the mask, and thereafter heating the solder film so as to form said solder bump adhered to said solder contact pad.

11. The method, according to claim 9, wherein said mask has a plurality of openings so that a plurality of solder contact pads are formed in preselected positions on said suspension.

12. The method, according to claim 11, wherein a plurality of solder bumps are formed by either evaporating a solder film onto the solder-wettable film through said mask openings or spreading solder paste onto the solder-wettable film through said mask openings and removing the mask, and thereafter heating the solder film so as to form said plurality of solder bumps adhered respectively to said plurality of solder contact pads.

13. The method of claim 12 wherein said solder bumps are formed in a preselected pattern by selectively positioning the plurality of openings in said mask.

14. The method of claim 11 wherein the height of each of said solder bumps is controlled by respectively controlling the volume of the solder and the size of the solder contact pads.

15. In a magnetic disk data storage system wherein a suspension arm supports and positions a head/slider combination to specific tracks at particular radii on a data surface of a magnetic disk and wherein said head/slider combination is electrically connected to external control circuitry, said suspension arm and head/slider assembly comprising:

a slider having an air bearing surface adapted to face said data surface of said disk and a back slide opposite said air bearing surface;

a suspension adapted to be attached to said back side of said slider to bias said slider in close proximity to but out of contact with said data surface of said disk so that data can be read from or written into said data surface;

means for attaching said suspension to said back side of said slider; and a spacing device including at least one solder bump for spacing said suspension a preselected distance from said slider wherein said attaching means include an adhesive medium surrounding said at least one solder bump.

16. The slider-suspension assembly, according to claim 15, wherein said spacing device includes a plurality of solder bumps of predetermined heights, each making point contact with said slider.

17. The slider-suspension assembly, according to claim 16, wherein said attaching means include an adhesive medium surrounding said solder bumps.

18. The slider-suspension assembly, according to claim 15, wherein said suspension is a laminated planar suspension.

19. The slider-suspension assembly, according to claim 18, wherein said suspension includes steel, insulating polyimide, and copper layers.

20. The slider-suspension assembly, according to claim 19, wherein said suspension has a plurality of copper pads on which a plurality of solder bumps are located for forming said spacing device between said slider and said suspension.

* * * * *